US008798877B2

United States Patent
Ayabe et al.

(10) Patent No.: US 8,798,877 B2
(45) Date of Patent: Aug. 5, 2014

(54) CONTROL DEVICE OF CONTINUOUSLY VARIABLE TRANSMISSION FOR VEHICLE

(75) Inventors: Atsushi Ayabe, Toyota (JP); Shinya Toyoda, Nisshin (JP); Kunio Hattori, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/814,331

(22) PCT Filed: Aug. 5, 2010

(86) PCT No.: PCT/JP2010/063264
§ 371 (c)(1),
(2), (4) Date: Feb. 5, 2013

(87) PCT Pub. No.: WO2012/017536
PCT Pub. Date: Feb. 9, 2012

(65) Prior Publication Data
US 2013/0218429 A1 Aug. 22, 2013

(51) Int. Cl.
*F16H 59/06* (2006.01)
*F16H 59/46* (2006.01)
*F16H 59/70* (2006.01)
*F16H 63/42* (2006.01)
*F16G 5/00* (2006.01)

(52) U.S. Cl.
USPC ......... 701/51; 701/61; 474/8; 474/18; 474/28

(58) Field of Classification Search
USPC .................. 701/56–62; 477/44–47; 474/8–46
See application file for complete search history.

(56) References Cited

U.S. PATENT DOCUMENTS

| 7,670,239 B2 * | 3/2010 | Suzuki | 474/8 |
| 8,352,134 B2 * | 1/2013 | Hattori et al. | 701/51 |
| 2006/0276279 A1 | 12/2006 | Suzuki | |

(Continued)

FOREIGN PATENT DOCUMENTS

| JP | 2006 342837 | 12/2006 |
| JP | 2007 255625 | 10/2007 |
| JP | 2008 8339 | 1/2008 |
| JP | 2008 51317 | 3/2008 |

OTHER PUBLICATIONS

International Search Report Issued Sep. 14, 2010 in PCT/JP10/063264 Filed Aug. 5, 2010.

*Primary Examiner* — John R Olszewski
*Assistant Examiner* — Daniel Johnson
(74) *Attorney, Agent, or Firm* — Oblon, Spivak, McClelland, Maier & Neustadt, L.L.P.

(57) ABSTRACT

A control device of a continuously variable transmission for a vehicle has a pair of variable pulleys and a transmission belt, and the control device respectively controls input-side and output-side thrust forces of input-side and output-side variable pulleys to set an actual gear ratio to a target gear ratio, prevents a slip of the transmission belt, and determines a lowest-speed-side gear ratio. When it is determined that a detection value of a rotation speed for calculating the actual gear ratio does not reflect an actual rotation speed, target input-side and output-side thrust forces are set to be target thrust forces for maintaining the lowest-speed-side gear ratio and preventing the slip of the transmission belt, and based on whether the actual gear ratio is already the lowest-speed-side gear ratio, values of the input-side and output-side thrust forces are changed for obtaining the target thrust forces.

18 Claims, 9 Drawing Sheets

(56) References Cited

U.S. PATENT DOCUMENTS

| | | | |
|---|---|---|---|
| 2008/0139350 A1* | 6/2008 | Iwasa et al. | 474/18 |
| 2008/0153636 A1* | 6/2008 | Inoue et al. | 474/28 |
| 2009/0299588 A1* | 12/2009 | Kawasumi et al. | 701/55 |
| 2012/0135829 A1* | 5/2012 | Doihara et al. | 474/28 |

* cited by examiner

CONTROL DEVICE OF CONTINUOUSLY VARIABLE TRANSMISSION FOR VEHICLE

TECHNICAL FIELD

The present invention relates to a control device of a continuously variable transmission for a vehicle that is a belt type continuously variable transmission respectively controlling an input-side thrust force and an output-side thrust force to achieve a gear ratio and having a lowest-speed-side gear ratio mechanically determined.

BACKGROUND ART

A control device of a continuously variable transmission for a vehicle (hereinafter, continuously variable transmission) is well known that has a pair of variable pulleys with variable effective diameters of an input-side variable pulley (a primary pulley, a primary sheave) and an output-side variable pulley (a secondary pulley, a secondary sheave) and a transmission belt wrapped around between the pair of the variable pulleys and that respectively controls an input-side thrust force (a primary thrust force) in the primary sheave and an output-side thrust force (secondary thrust force) in the secondary sheave to set an actual gear ratio to a target gear ratio and preventing a slip of the transmission belt. This corresponds to control devices for vehicles described in Patent Documents 1 and 2. Generally, in such a continuously variable transmission, for example, the primary thrust force and the secondary thrust force are set to control a pulley pressure (primary pressure) in the input-side variable pulley and a pulley pressure (secondary pressure) in the output-side variable pulley such that a target gear ratio is achieved while preventing a belt slip, and feedback control is provided based on a deviation between an actual gear ratio calculated by using detection values of an input-side rotation speed and an output-side rotation speed in the continuously variable transmission (actual gear ratio=input-side rotation speed/output-side rotation speed) and a target gear ratio to fine-tune and control the primary pressure (or primary thrust force), for example.

To accurately calculate the actual gear ratio, the input-side rotation speed and the output-side rotation speed must more accurately be detected by a rotation sensor, for example. However, because of the characteristics of the rotation sensor, for example, a rotation speed may not accurately be detected in an extremely low rotation speed range and a detection value of a rotation speed may not reflect an actual rotation speed (actual rotation speed). If such a rotation sensor is used, the target gear ratio can properly be achieved in the running state in which a detection value of a rotation speed reflects the actual rotation speed. However, in the running state in which a detection value of a rotation speed does not reflect the actual rotation speed, the actual gear ratio is not known and the target gear ratio may not properly be achieved because of control variations etc. in a thrust force (or pulley pressure) and an input torque assumed in this case. Particularly, to ensure the vehicle restart during vehicle stop or the reacceleration performance during low-speed running, it is desired to maintain a gear ratio of the continuously variable transmission at a lowest-speed-side gear ratio (a Lowest, a maximum gear ratio). Therefore, during vehicle decelerated running while a gear ratio is controlled toward the lowest-speed-side gear ratio, it is desirable to control the gear ratio to the lowest-speed-side gear ratio during the running state in which a detection value of a rotation speed from the rotation sensor reflects the actual rotation speed.

However, for example, during rapid deceleration running, the gear ratio may not be returned to the lowest-speed-side gear ratio during the running state in which a detection value of a rotation speed reflects the actual rotation speed and it may become unknown whether the gear ratio is finally set to the lowest-speed-side gear ratio. For such a problem, for example, Patent Document1 proposes to fix the pulley pressures (primary pressure and secondary pressure) and limit the input torque at the restart of a vehicle in accordance with the determination of possibility of an improper speed change preventing a gear ratio from returning to the lowest-speed-side gear ratio when a vehicle is stopped, and to cancel the fixation and limitation when a rotation sensor can properly detect a rotation speed.

PRIOR ART DOCUMENTS

Patent Documents

Patent Document 1: Japanese Laid-Open Patent Publication No. 2006-342837
Patent Document 2: Japanese Laid-Open Patent Publication No. 2007-255625

SUMMARY OF THE INVENTION

Problems to Be Solved by the Invention

However, the technique proposed by Patent Document 1 does not assure a belt return, i.e., a return of the gear ratio to the lowest-speed-side gear ratio. Since input torque is limited, i.e., the torque is lowered at the restart of a vehicle, the acceleration performance (start performance) at the restart is not certainly ensured. On the other hand, with regard to the problem, separately from Patent Document 1, it is conceivable to maintain the lowest-speed-side gear ratio by keeping the primary thrust force and the secondary thrust force high so as to provide control such that no belt slip occurs. However, in this case, although the lowest-speed-side gear ratio can be achieved, because the primary thrust force and the secondary thrust force are made higher than necessary, the pulley pressures are always made higher during low-speed running and during vehicle stop and, therefore, fuel efficiency may be reduced. The problems described above are not well-known and no proposal has hitherto been made on retaining the gear ratio to the lowest-speed-side gear ratio without causing a belt slip regardless of whether a gear ratio is returned to the lowest-speed-side gear ratio during the running state in which a detection value of a rotation speed reflects the actual rotation speed.

The present invention was conceived in view of the situations and it is therefore an object of the present invention to provide a control device of a continuously variable transmission for a vehicle capable of retaining a gear ratio to a lowest-speed-side gear ratio without causing a belt slip even when a detection value of a rotation speed does not reflect an actual rotation speed.

Means for Solving the Problems

To achieve the object, the present invention provides (a) a control device of a continuously variable transmission for a vehicle having a pair of variable pulleys with variable effective diameters of an input-side variable pulley and an output-side variable pulley and a transmission belt wrapped around between the pair of the variable pulleys, the continuously variable transmission respectively controlling an input-side thrust force of the input-side variable pulley and an output-side thrust force of the output-side variable pulley to set an actual gear ratio to a target gear ratio and preventing a slip of the transmission belt, the continuously variable transmission having a lowest-speed-side gear ratio determined by mechanically preventing movement of an input-side rotating body moved in an axial direction for varying an effective diameter of the input-side variable pulley, (b) the control device differentiating control methods of the input-side thrust force and the output-side thrust force based on whether the actual gear ratio is already the lowest-speed-side gear ratio if it is determined that a detection value of a rotation speed for calculating the actual gear ratio does not reflect an actual rotation speed.

Consequently, if it is determined that an actual rotation speed is not reflected by a detection value of a rotation speed for calculating the actual gear ratio, the control methods of the input-side thrust force and the output-side thrust force are differentiated based on whether the actual gear ratio is already the lowest-speed-side gear ratio and, therefore, for example, even when the actual rotation speed is not reflected by the detection value of the rotation speed, the actual gear ratio can be retained at the lowest-speed-side gear ratio without causing a belt slip of the continuously variable transmission for a vehicle regardless of whether the actual gear ratio is already the lowest-speed-side gear ratio.

Preferably, if the actual gear ratio is already the lowest-speed-side gear ratio, a target input-side thrust force and a target output-side thrust force are set to be thrust forces for maintaining the lowest-speed-side gear ratio and preventing a slip of the transmission belt, and wherein the target input-side thrust force is made lower by a predetermined value. Consequently, for example, the control can be provided such that a slip of the transmission belt is prevented from occurring while maintaining the lowest-speed-side gear ratio. Since the input-side pulley pressure in the input-side variable pulley can be reduced, the fuel efficiency improving effect can be acquired. In other words, if it is known that the actual gear ratio is the lowest-speed-side gear ratio, the input-side movable rotating body is mechanically prevented from moving (is abutting on a hardware limit) and the reduction of the input-side pulley pressure from the pulley pressure for maintaining the lowest-speed-side gear ratio does not move the input-side movable rotating body and does not reduce the belt clamping pressure any more. Therefore, even if the target input-side thrust force is made lower by a predetermined value, the lowest-speed-side gear ratio can be maintained while a slip of the transmission belt is prevented.

Preferably, if the actual gear ratio is not yet the lowest-speed-side gear ratio, a target input-side thrust force and a target output-side thrust force are set to be thrust forces for maintaining the lowest-speed-side gear ratio and preventing a slip of the transmission belt, and wherein the target output-side thrust force is made higher by a predetermined value. Consequently, for example, even if the gear ratio does not reach the lowest-speed-side gear ratio during the running state in which the detection value of the rotation speed reflects the actual rotation speed, a belt slip can be prevented while the gear ratio is controlled toward the lowest-speed-side gear ratio. In other words, if the lowest-speed-side gear ratio is not reached, the movement position of the input-side movable rotating body is unknown and, therefore, when the input-side pulley pressure is reduced from the pulley pressure for maintaining the lowest-speed-side gear ratio, the input-side movable rotating body may move in the direction of loosening the transmission belt and cause a belt slip. Therefore, only the target output-side thrust force is made higher by a predetermined value relative to the thrust forces for maintaining the lowest-speed-side gear ratio to maintain the lowest-speed-side gear ratio and preventing a slip of the transmission belt.

Preferably, the thrust forces for maintaining the lowest-speed-side gear ratio are sequentially set based on an input torque of the continuously variable transmission for a vehicle, and wherein the predetermined value is a value obtained in advance to correspond control variation amounts of the input-side thrust force and the output-side thrust force for certainly acquiring the thrust forces capable of maintaining the lowest-speed-side gear ratio when the thrust forces are controlled. Consequently, the lowest-speed-side gear ratio can properly be maintained while a slip of the transmission belt is certainly prevented, for example.

Preferably, the control methods of the input-side thrust force and the output-side thrust force are differentiated during vehicle deceleration running when the gear ratio is controlled toward the lowest-speed-side gear ratio. Consequently, the actual gear ratio can be retained at the lowest-speed-side gear ratio without causing a belt slip of the continuously variable transmission for a vehicle during vehicle stop and during extremely-low-speed running, for example. Therefore, the vehicle restart performance during vehicle stop and the reacceleration performance during low-speed running are properly ensured.

Preferably, a detection value of the rotation speed is within a rotation speed range less than an extremely low rotation speed obtained in advance as a rotation speed range in which the reliability of the detection value is reduced, it is determined that the detection value of the rotation speed does not reflect an actual rotation speed. Consequently, the actual gear ratio can be retained at the lowest-speed-side gear ratio without causing a belt slip of the continuously variable transmission for a vehicle during vehicle stop and during extremely-low-speed running, for example. Therefore, the vehicle restart performance during vehicle stop and the reacceleration performance during low-speed running are properly ensured.

MODE FOR CARRYING OUT THE INVENTION

In the present invention, preferably, the input-side thrust force and the output-side thrust force are respectively directly or indirectly controlled by configuring a control circuit such that the pulley pressures acting on the input-side variable pulley and the output-side variable pulley are controlled independently of each other.

An embodiment of the present invention will now be described in detail with reference to the drawings.

Embodiment

Figure 1:
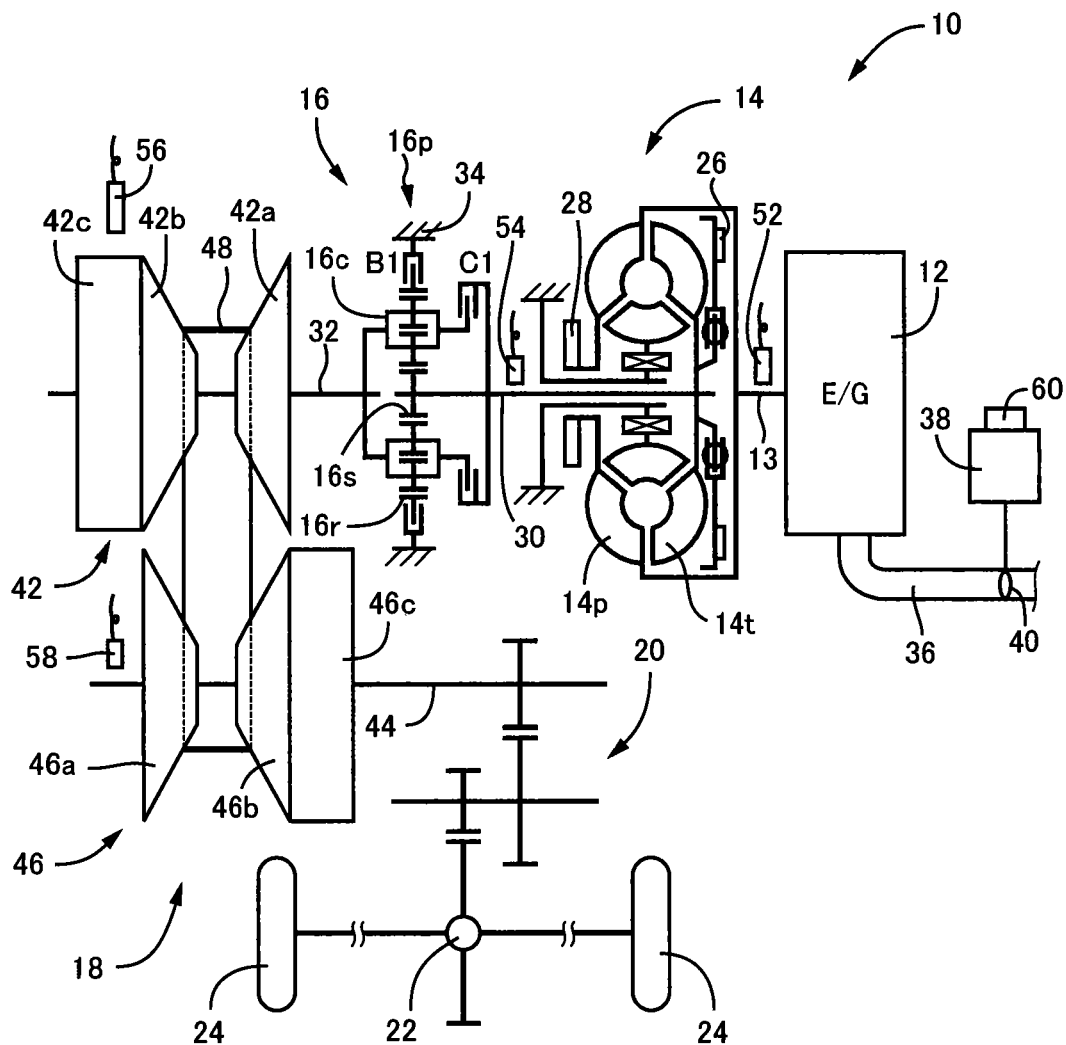
FIG. 1 is a diagram for explaining a general configuration of a power transmission path making up a vehicle to which the present invention is applied.

FIG. 1 is a diagram for explaining a general configuration of a power transmission path from an engine 12 to drive wheels 24 making up a vehicle 10 to which the present invention is applied. In FIG. 1, for example, the power generated by the engine 12 used as a drive force source for running is transmitted sequentially through a torque converter 14 acting as a hydraulic transmission device, a forward/reverse switching device 16, a belt type continuously variable transmission 18 (hereinafter referred to as a continuously variable transmission (CVT)) acting as a continuously variable transmission for a vehicle, a reduction gear device 20, a differential gear device 22, etc., to the left and right drive wheels 24.

The torque converter 14 includes a pump impeller 14p coupled to a crankshaft 13 of the engine 12 and a turbine impeller 14t coupled to the forward/reverse switching device 16 via a turbine shaft 30 corresponding to an output-side member of the torque converter 14 to transmit power via fluid. A lockup clutch 26 is disposed between the pump impeller 14p and the turbine impeller 14t, and the complete engagement of the lockup clutch 26 causes the pump impeller 14p and the turbine impeller 14t to integrally rotate. The pump impeller 14p is coupled to a mechanical oil pump 28 rotationally driven by the engine 12 to generate an operating oil pressure for providing shift control to the continuously variable transmission 18, to generate a belt clamping pressure in the continuously variable transmission 18, to control a torque capacity of the lockup clutch 26, to switch a power transmission path in the forward/reverse switching device 16, and to supply lubricant oil to the portions of the power transmission path of the vehicle 10.

The forward/reverse switching device 16 is mainly made up of a forward clutch C1, a reverse brake B1, and a double pinion type planetary gear device 16p with a sun gear 16s integrally coupled to the turbine shaft 30 of the torque converter 14 and a carrier 16c integrally coupled to an input shaft 32 of the continuously variable transmission 18 and, on the other hand, the carrier 16c and the sun gear 16s are selectively coupled via the forward clutch C1 while a ring gear 16r is selectively fixed via the reverse brake B1 to a housing 34 acting as a non-rotating member. The forward clutch C1 and the reverse brake B1 correspond to an interrupting device and both are hydraulic friction engagement devices caused to be frictionally engaged by a hydraulic cylinder.

In the forward/reverse switching device 16 configured as above, when the forward clutch C1 is engaged and the reverse brake B1 is released, the forward/reverse switching device 16 is put into an integrally rotating state and the turbine shaft 30 is directly coupled to the input shaft 32 to establish (achieve) a forward power transmission path, thereby transmitting a drive force in the forward direction to the continuously variable transmission 18. When the reverse brake B1 is engaged and the forward clutch C1 is released, a reverse power transmission path is established (achieved) in the forward/reverse switching device 16 and the input shaft 32 is rotated in the reverse direction relative to the turbine shaft 30, thereby transmitting a drive force in the reverse direction to the continuously variable transmission 18. When both the forward clutch C1 and the reverse brake B1 are released, the forward/reverse switching device 16 is put into a neutral state (power transmission interrupted state) in which the power transmission is interrupted.

The engine 12 is made up of an internal-combustion engine such as a gasoline engine and a diesel engine, for example. An intake pipe 36 of the engine 12 is disposed with an electronic throttle valve 40 for electrically controlling an intake air quantity $Q_{AIR}$ of the engine 12 by using a throttle actuator 38.

The continuously variable transmission 18 includes a pair of variable pulleys 42 and 46 that are the input-side variable pulley (the primary pulley, the primary sheave) 42 having a variable effective diameter, i.e., an input-side member disposed on the input shaft 32, and the output-side variable pulley (the secondary pulley, the secondary sheave) 46 having a variable effective diameter, i.e., an output-side member disposed on an output shaft 44, and a transmission belt 48 wrapped around between the pair of the variable pulleys 42 and 46, and the power is transmitted through a frictional force between the pair of the variable pulleys 42, 46 and the transmission belt 48.

The input-side variable pulley 42 includes a fixed rotating body 42a as an input-side fixed rotating body fixed to the input shaft 32, a movable rotating body 42b as an input-side movable rotating body disposed relatively non-rotatably around the axis and movably in the axial direction relative to the input shaft 32, and an input-side hydraulic cylinder (primary-side hydraulic cylinder) 42c as a hydraulic actuator applying an input-side thrust force (primary thrust force) Win (=a primary pressure Pin×a pressure receiving area) in the input-side variable pulley 42 for changing a V-groove width therebetween. The output-side variable pulley 46 includes a fixed rotating body 46a as an output-side fixed rotating body fixed to the output shaft 44, a movable rotating body 46b as an output-side movable rotating body disposed relatively non-rotatably around the axis and movably in the axial direction relative to the output shaft 44, and an output-side hydraulic cylinder (secondary-side hydraulic cylinder) 46c as a hydraulic actuator applying an output-side thrust force (secondary thrust force) Wout (=a secondary pressure Pout×a pressure receiving area) in the output-side variable pulley 46 for changing a V-groove width therebetween.

The primary pressure Pin, i.e., an oil pressure to the input-side hydraulic cylinder 42c, and the secondary pressure Pout, i.e., an oil pressure to the output-side hydraulic cylinder 46c, are adjusted and controlled independently of each other by a hydraulic control circuit 100 (see FIG. 3) to respectively directly or indirectly control the primary thrust force Win and the secondary thrust force Wout. As a result, the V-groove widths of the pair of the variable pulleys 42 and 46 are changed to vary the wrapping diameters (effective diameters) of the transmission belt 48 so as to continuously vary a gear ratio (gear ratio) γ (=input shaft rotation speed $N_{IN}$/output shaft rotation speed $N_{OUT}$) while a friction force (belt clamping pressure) between the pair of the variable pulleys 42, 46 and the transmission belt 48 is controlled so as not to cause a slip of the transmission belt 48.

Therefore, the primary thrust force Win and the secondary thrust force Wout are respectively controlled to set an actual gear ratio (actual gear ratio) γ to a target gear ratio γ* while a slip of the transmission belt 48 is prevented. The input shaft rotation speed $N_{IN}$ is a rotation speed of the input shaft 32 and the output shaft rotation speed $N_{OUT}$ is a rotation speed of the output shaft 44. In the present embodiment, as can be seen from in FIG. 1, the input shaft rotation speed $N_{IN}$ is the same as the rotation speed of the input-side variable pulley 42 and the output shaft rotation speed $N_{OUT}$ is the same as the rotation speed of the output-side variable pulley 46.

In the continuously variable transmission 18, for example, when the primary pressure Pin is increased, the V-groove width of the input-side variable pulley 42 is narrowed and the gear ratio γ is reduced, i.e., the continuously variable transmission 18 is shifted up. When the primary pressure Pin is decreased, the V-groove width of the input-side variable pulley 42 is widened and the gear ratio γ is increased, i.e., the continuously variable transmission 18 is shifted down. Therefore, when the V-groove width of the input-side variable pulley 42 is maximized, a maximum gear ratio γmax (the lowest-speed-side gear ratio, the Lowest) is formed as the gear ratio γ of the continuously variable transmission 18. For example, as depicted in a partial cross-sectional schematic of the input-side variable pulley 42 of FIG. 3, this embodiment employs a structure in which an end tip 42b1 of the movable rotating body 42b movable in the axial direction of the input shaft 32 abuts on a stopper ring 42d to mechanically prevent the movement of the movable rotating body 42b (i.e., movement in the direction of widening the V-groove width of the input-side variable pulley 42), thereby achieving (forming) the Lowest mechanically (by hardware). The maximum gear ratio γmax is determined by mechanically preventing the movement of the movable rotating body 42b moved in the axial center direction for changing the effective diameter of the input-side variable pulley 42.

Figure 2:
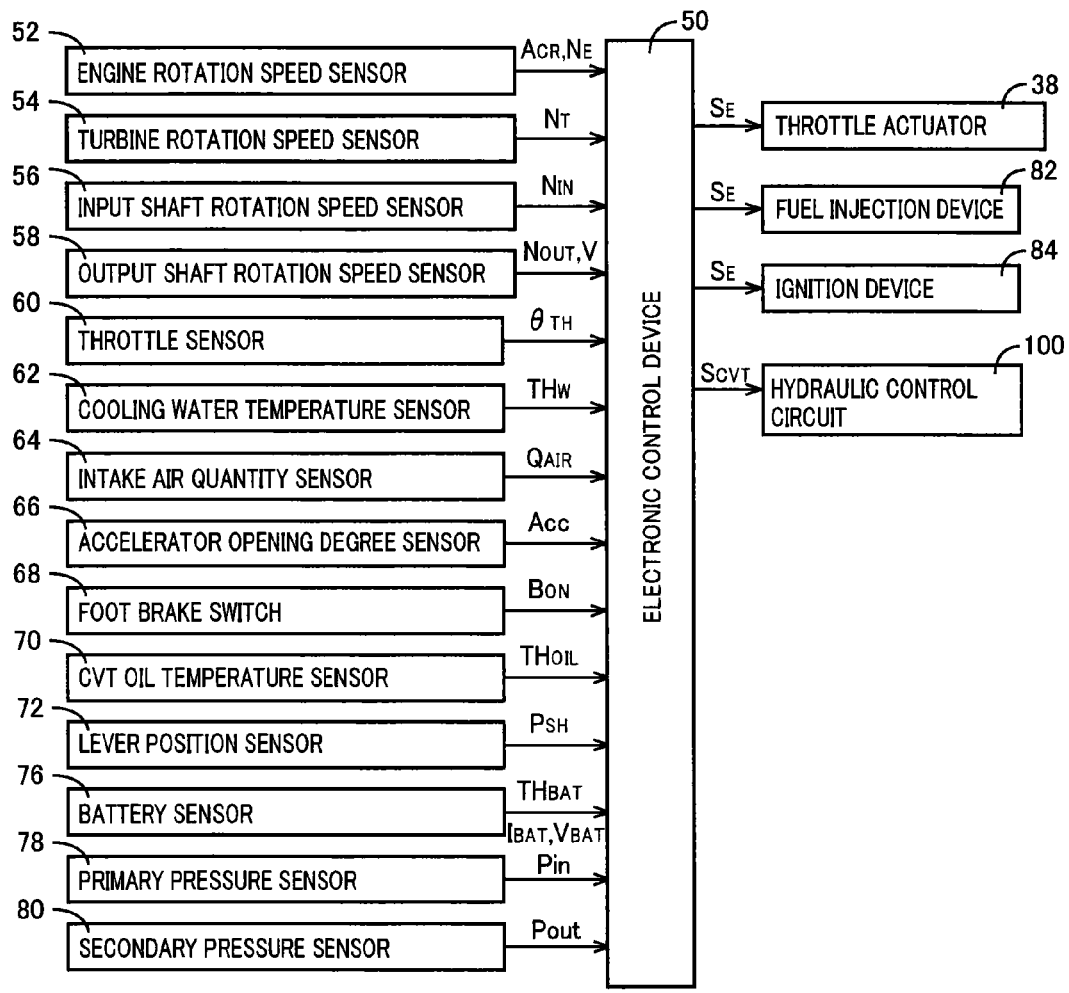
FIG. 2 is a block diagram for explaining a main portion of a control system disposed in the vehicle.

FIG. 2 is a block diagram for explaining a main portion of a control system disposed in the vehicle 10 for controlling the engine 12 and the continuously variable transmission 18. In FIG. 2, the vehicle 10 includes an electronic control device 50 including a control device of a continuously variable transmission for a vehicle related to the shift control of the continuously variable transmission 18, for example. The electronic control device 50 includes a so-called microcomputer having a CPU, a RAM, a ROM, and an I/O interface, for example, and the CPU executes signal processes in accordance with programs stored in advance in the ROM, while utilizing a temporary storage function of the RAM, to provide various controls of the vehicle 10. For example, the electronic control device 50 provides the output control of the engine 12, the shift control and the belt clamping pressure control of the continuously variable transmission 18, the torque capacity control of the lockup clutch 26, etc., and is configured separately for the engine control, the hydraulic control of the continuously variable transmission 18 and the lockup clutch 26, etc., as needed.

The electronic control device 50 is supplied with signals indicative of a rotation angle (position) $A_{CR}$ of the crankshaft 13 and a rotation speed (engine rotation speed) $N_E$ of the engine 12 detected by an engine rotation speed sensor 52; a signal indicative of a rotation speed (turbine rotation speed) $N_T$ of the turbine shaft 30 detected by a turbine rotation speed sensor 54; a signal indicative of the input shaft rotation speed $N_{IN}$ that is an input rotation speed of the continuously variable transmission 18 detected by an input shaft rotation speed sensor 56; a signal indicative of the output shaft rotation speed $N_{OUT}$ that is an output rotation speed of the continuously variable transmission 18 corresponding to a vehicle speed V detected by an output shaft rotation speed sensor 58; a signal indicative of a throttle valve opening degree $θ_{TH}$ of the electronic throttle valve 40 detected by a throttle sensor 60; a signal indicative of a cooling water temperature $TH_W$ of the engine 12 detected by a cooling water temperature sensor 62; a signal indicative of the intake air quantity $Q_{AIR}$ of the engine 12 detected by an intake air quantity sensor 64; a signal indicative of an accelerator opening degree Acc that is an operation amount of an accelerator pedal as an acceleration request amount of a driver detected by an accelerator opening degree sensor 66; a signal indicative of brake-on $B_{ON}$ indicative of a state of operating a foot brake, i.e., a regular brake, detected by a foot brake switch 68; a signal indicative of an oil temperature $TH_{OIL}$ of the operating oil of the continuously variable transmission 18 etc., detected by a CVT oil temperature sensor 70; a signal indicative of a lever position (operation position) $P_{SH}$ of a shift lever detected by a lever position sensor 72; signals indicative of a battery temperature $TH_{BAT}$, a battery input/output current (battery charging/discharging current) $I_{BAT}$, and a battery voltage $V_{BAT}$ detected by a battery sensor 76; a signal indicative of the primary pressure Pin that is a supply oil pressure to the input-side variable pulley 42 detected by a primary pressure sensor 78; a signal indicative of the secondary pressure Pout that is a supply oil pressure to the output-side variable pulley 46 detected by a secondary pressure sensor 80, etc. The electronic control device 50 sequentially calculates a state of charging (charging capacity) SOC of a battery (electric storage device) based on the battery temperature $TH_{BAT}$, the battery charging/discharging current $I_{BAT}$, and the battery voltage $V_{BAT}$, for example. The electronic control device 50 sequentially calculates the actual gear ratio γ (=$N_{IN}/N_{OUT}$) of the continuously variable transmission 18 based on the output shaft rotation speed $N_{OUT}$ and the input shaft rotation speed $N_{IN}$, for example.

The electronic control device 50 outputs an engine output control command signal $S_E$ for the output control of the engine 12, an hydraulic control command signal $S_{CVT}$ for the hydraulic control related to the shift of the continuously variable transmission 18, etc. Specifically, the electronic control device 50 outputs a throttle signal for controlling opening/closing of the electronic throttle valve 40 by driving the throttle actuator 38, an injection signal for controlling an amount of fuel injected from a fuel injection device 82, an ignition timing signal for controlling the timing of ignition of the engine 12 by an ignition device 84, etc., as the engine output control command signal $S_E$. The electronic control device 50 outputs a command signal for driving a linear solenoid valve SLP adjusting the primary pressure Pin, a command signal for driving a linear solenoid valve SLS adjusting the secondary pressure Pout, and a command signal for driving a linear solenoid valve SLT controlling a line oil pressure $P_L$, etc., as the hydraulic control command signal $S_{CVT}$ to the hydraulic control circuit 100.

Figure 3:
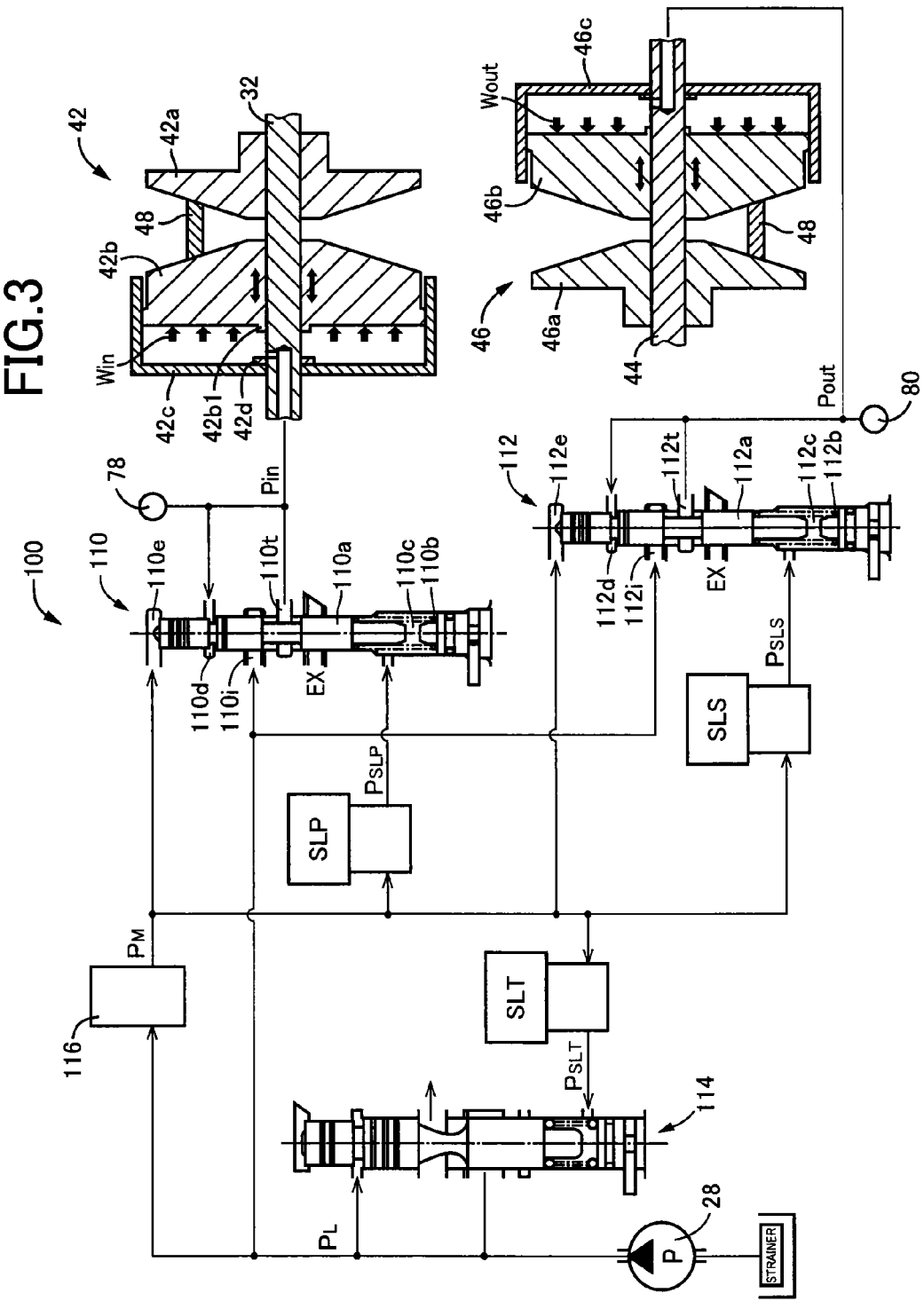
FIG. 3 is a hydraulic circuit diagram of a main portion relevant to hydraulic control related to the shift of the continuously variable transmission in the hydraulic control circuit.

FIG. 3 is a hydraulic circuit diagram of a main portion relevant to hydraulic control related to the shift of the continuously variable transmission 18 in the hydraulic control circuit 100. In FIG. 3, the hydraulic control circuit 100 includes, for example, the oil pump 28, a primary pressure control valve 110 adjusting the primary pressure Pin, a secondary pressure control valve 112 adjusting the secondary pressure Pout, a primary regulator valve (line oil pressure adjusting valve) 114, a modulator valve 116, the linear solenoid valve SLT, the linear solenoid valve SLP, the linear solenoid valve SLS, etc.

The line oil pressure $P_L$ is adjusted, for example, from an original pressure that is an operating oil pressure output (generated) from the oil pump 28, by the relief type primary regulator valve 114 to a value corresponding to an engine load etc., based on a control oil pressure $P_{SLT}$ that is an output oil pressure of the linear solenoid valve SLT. Specifically, the line oil pressure $P_L$ is adjusted based on the control oil pressure $P_{SLT}$ set to acquire an oil pressure obtained by adding a predetermined allowance (margin) to a higher one of the primary pressure Pin and the secondary pressure Pout. Therefore, the insufficient line oil pressure $P_L$ can be avoided when used as the original pressure in the adjustment operation of the primary pressure control valve 110 and the secondary pressure control valve 112, and the line oil pressure $P_L$ can be prevented from being unnecessarily increased. A modulator oil pressure $P_M$ acts as original pressures of a control oil pressure $P_{SLT}$ controlled by the electronic control device 50, a control oil pressure $P_{SLP}$ that is an output oil pressure of the linear solenoid valve SLP, and a control oil pressure $P_{SLS}$ that is an output oil pressure of the linear solenoid valve SLS, and is adjusted from an original pressure that is the line oil pressure $P_L$ by the modulator valve 116 to a constant pressure.

The primary pressure control valve 110 includes a spool valve piece 110a disposed movably in the axial direction to open/close an input port 110i so that the line oil pressure $P_L$ can be supplied from the input port 110i through an output port 110t to the input-side variable pulley 42; a spring 110b acting as a biasing means biasing the spool valve piece 110a in the valve-opening direction; an oil chamber 110c housing the spring 110b and receiving the control oil pressure $P_{SLP}$ for applying a thrust force in the valve-opening direction to the spool valve piece 110a; a feedback oil chamber 110d receiving the line oil pressure $P_L$ output from the output port 110t for applying the thrust force in the valve-closing direction to the spool valve piece 110a; and an oil chamber 110e receiving the modulator oil pressure $P_M$ for applying the thrust force in the valve-closing direction to the spool valve piece 110a. The primary pressure control valve 110 configured as above uses, for example, the control oil pressure $P_{SLP}$ as a pilot pressure to adjust and control the line oil pressure $P_L$ and supplies the line oil pressure $P_L$ to the input-side hydraulic cylinder 42c of the input-side variable pulley 42. As a result, the primary pressure Pin supplied to the input-side hydraulic cylinder 42c is controlled. For example, if the control oil pressure $P_{SLP}$ output from the linear solenoid valve SLP increases from the state in which the input-side hydraulic cylinder 42c is supplied with a predetermined oil pressure, the spool valve piece 110a of the primary pressure control valve 110 moves toward the upper side of FIG. 3. As a result, the primary pressure Pin to the input-side hydraulic cylinder 42c increases. On the other hand, if the control oil pressure $P_{SLP}$ output from the linear solenoid valve SLP decreases from the state in which the input-side hydraulic cylinder 42c is supplied with a predetermined oil pressure, the spool valve piece 110a of the primary pressure control valve 110 moves toward the lower side of FIG. 3. As a result, the primary pressure Pin to the input-side hydraulic cylinder 42c decreases.

The secondary pressure control valve 112 includes a spool valve piece 112a disposed movably in the axial direction to open/close an input port 112i so that the line oil pressure $P_L$ can be supplied from the input port 112i through an output port 112t to the output-side variable pulley 46 as the secondary pressure Pout; a spring 112b acting as a biasing means biasing the spool valve piece 112a in the valve-opening direction; an oil chamber 112c housing the spring 112b and receiving the control oil pressure $P_{SLS}$ for applying a thrust force in the valve-opening direction to the spool valve piece 112a; a feedback oil chamber 112d receiving the secondary pressure Pout output from the output port 112t for applying the thrust force in the valve-closing direction to the spool valve piece 112a; and an oil chamber 112e receiving the modulator oil pressure $P_M$ for applying the thrust force in the valve-closing direction to the spool valve piece 112a. The secondary pressure control valve 112 configured as above uses, for example, the control oil pressure $P_{SLS}$ as a pilot pressure to adjust and control the line oil pressure $P_L$ and supplies the line oil pressure $P_L$ to the output-side hydraulic cylinder 46c of the output-side variable pulley 46. As a result, the secondary pressure Pout supplied to the output-side hydraulic cylinder 46c is controlled. For example, if the control oil pressure $P_{SLS}$ output from the linear solenoid valve SLS increases from the state in which the output-side hydraulic cylinder 46c is supplied with a predetermined oil pressure, the spool valve piece 112a of the secondary pressure control valve 112 moves toward the upper side of FIG. 3. As a result, the secondary pressure Pout to the output-side hydraulic cylinder 46c increases. On the other hand, if the control oil pressure $P_{SLS}$ output by the linear solenoid valve SLS decreases from the state in which the output-side hydraulic cylinder 46c is supplied with a predetermined oil pressure, the spool valve piece 112a of the secondary pressure control valve 112 moves toward the lower side of FIG. 3. As a result, the secondary pressure Pout to the output-side hydraulic cylinder 46c decreases.

In the hydraulic control circuit 100 configured as above, for example, the primary pressure Pin adjusted by the linear solenoid valve SLP and the secondary pressure Pout adjusted by the linear solenoid valve SLS are controlled so as to generate a belt clamping pressure without causing a belt slip and without an unnecessary increase in a pair of the variable pulleys 42 and 46. As described later, the correlation between the primary pressure Pin and the secondary pressure Pout changes a thrust force ratio Rw (=Wout/Win) of a pair of the variable pulleys 42 and 46 to vary the gear ratio γ of the continuously variable transmission 18. For example, as the thrust force ratio Rw is made larger, the gear ratio γ is made larger (i.e., the continuously variable transmission 18 is shifted down).

Figure 4:
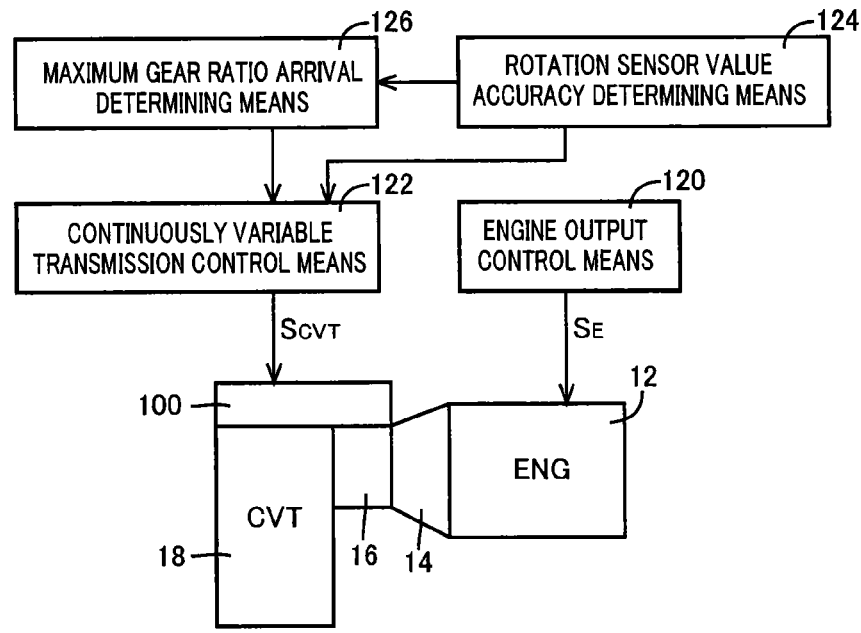
FIG. 4 is a functional block diagram for explaining a main portion of the control function of the electronic control device.

FIG. 4 is a functional block diagram for explaining a main portion of the control function of the electronic control device 50. In FIG. 4, an engine output control portion, i.e., an engine output control means 120 outputs, for example, the engine output control command signal $S_E$ such as the throttle signal, the injection signal, and the ignition timing signal to the throttle actuator 38, the fuel injection device 82, and the ignition device 84, respectively, for the output control of the engine 12. For example, the engine output control means 120 sets a target engine torque $T_E^*$ for acquiring a drive force (drive torque) corresponding to the accelerator opening degree Acc, controls the opening/closing of the electronic throttle valve 40 through the throttle actuator 38 so as to acquire the target engine torque $T_E^*$, controls a fuel injection amount through the fuel injection device 82, and controls the ignition timing through the ignition device 84.

A continuously variable transmission control portion, i.e., a continuously variable transmission control means 122 determines a primary instruction pressure Pintgt as a command value (or target value) of the primary pressure Pin and a secondary instruction pressure Pouttgt as a command value (or target value) of the secondary pressure Pout such that the target gear ratio $\gamma^*$ of the continuously variable transmission 18 is achieved while a belt slip of the continuously variable transmission 18 is prevented from occurring, for example.

Figure 5:
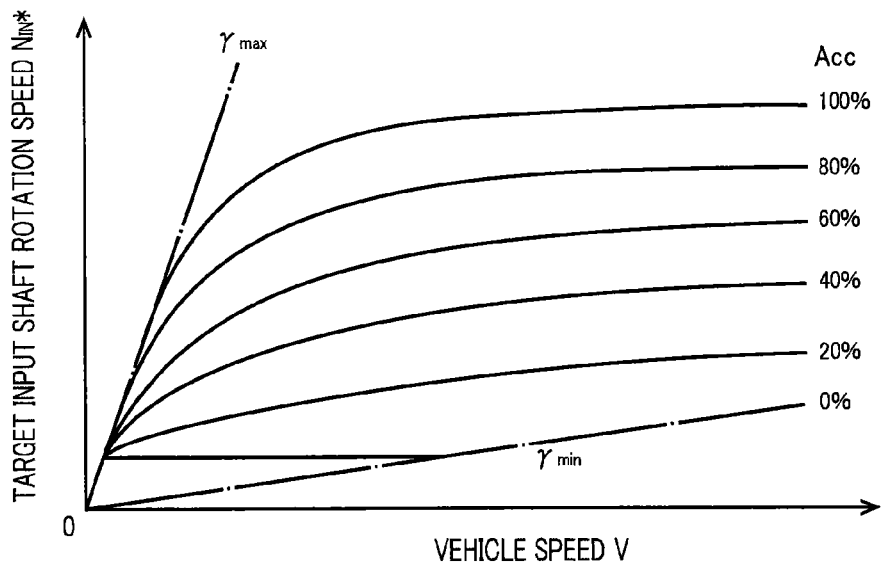
FIG. 5 is a diagram of an example of a shift map used when a target input shaft rotation speed is obtained in the hydraulic control related to the shift of the continuously variable transmission.

Specifically, the continuously variable transmission control means 122 determines the target gear ratio $\gamma^*$ that is the gear ratio $\gamma$ to be achieved after a shift of the continuously variable transmission 18. The continuously variable transmission control means 122 sets a target input shaft rotation speed $N_{IN}^*$ based on a vehicle state indicated by the actual vehicle speed V and the accelerator opening degree Acc from a preliminarily stored relationship (shift map) between the vehicle speed V corresponding to the output shaft rotation speed $N_{OUT}$ and the target input shaft rotation speed $N_{IN}^*$ of the continuously variable transmission 18 represented by using the accelerator opening degree Acc as a parameter as depicted in FIG. 5, for example. The continuously variable transmission control means 122 calculates the target gear ratio $\gamma^*$ ($=N_{IN}^*/N_{OUT}$) based on the target input shaft rotation speed $N_{IN}^*$. The shift map of FIG. 5 corresponds to a shift condition and has the target input shaft rotation speed $N_{IN}^*$ set such that a greater gear ratio $\gamma$ is achieved when the vehicle speed V is smaller and the accelerator opening degree Acc is larger. The target gear ratio $\gamma^*$ is set within a range between a minimum gear ratio $\gamma$min (the highest-speed gear ratio, the Highest) and a maximum gear ratio $\gamma$max (the lowest-speed gear ratio, the Lowest) of the continuously variable transmission 18.

Figure 6:
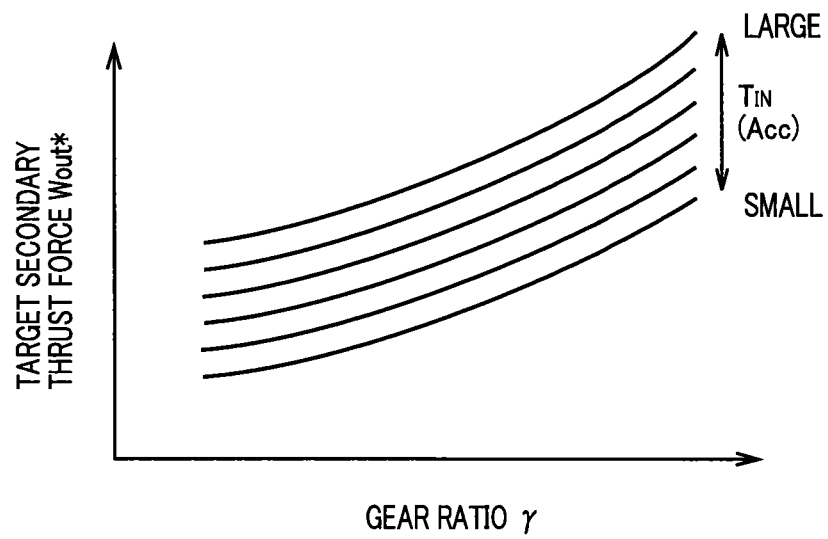
FIG. 6 is a diagram of an example of a thrust force map to obtain a target secondary thrust force depending on gear ratios etc., in the hydraulic control related to the shift of the continuously variable transmission.
Figure 7:
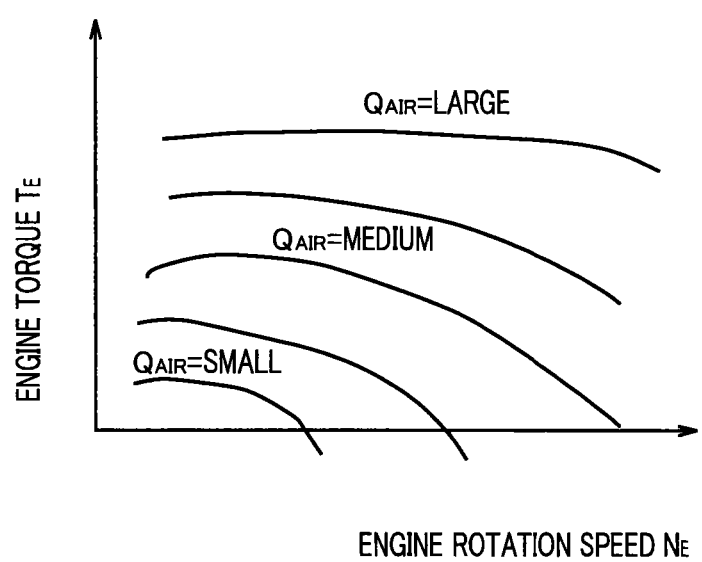
FIG. 7 is a diagram of an example of a map between the engine rotation speed and the engine torque empirically obtained and stored in advance by using the intake air quantity as a parameter.
Figure 8:
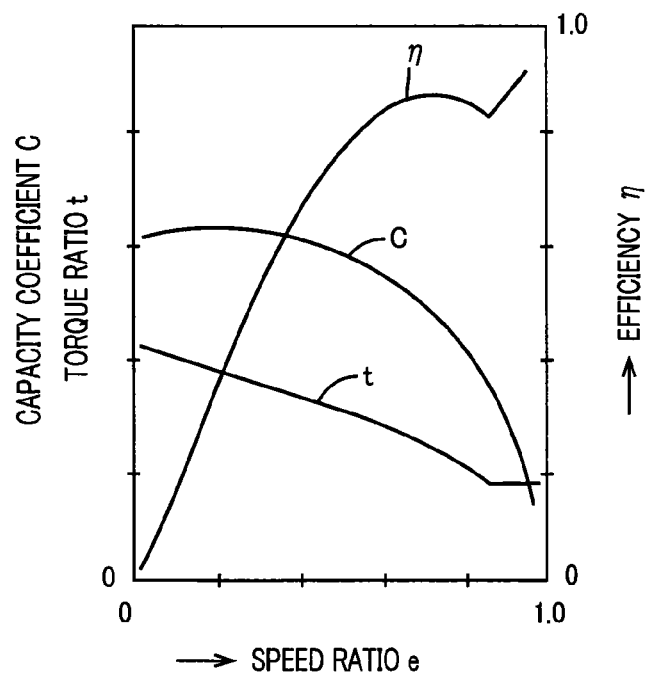
FIG. 8 is a diagram of an example of a map empirically obtained and stored in advance as a predetermined operation characteristic of the torque converter.

The continuously variable transmission control means 122 sets a target secondary thrust force Wout* based on a vehicle state indicated by an input torque $T_{IN}$ of the continuously variable transmission 18 and the actual gear ratio $\gamma$ from a relationship (thrust force map) between the gear ratio $\gamma$ and the target secondary thrust force Wout* empirically obtained and stored in advance such that no belt slip occurs by using the input torque $T_{IN}$ of the continuously variable transmission 18 as a parameter as depicted in FIG. 6, for example. The input torque $T_{IN}$ of the continuously variable transmission 18 is calculated by the electronic control device 50 as a torque ($=T_E \times t$) acquired by multiplying an engine torque $T_E$ by a torque ratio t ($=$a turbine torque $T_T$ that is the output torque of the torque converter 14/a pump torque $T_P$ that is the input torque of the torque converter 14) of the torque converter 14, for example. This engine torque $T_E$ is calculated by the electronic control device 50 as an estimated engine torque $T_E$es based on the intake air quantity $Q_{AIR}$ and the engine rotation speed $N_E$ from a relationship (a map, an engine torque characteristic diagram) between the engine rotation speed $N_E$ and the engine torque $T_E$ empirically obtained and stored in advance by using the intake air quantity $Q_{AIR}$ acting as a request load to the engine 12 (or a throttle valve opening degree $\theta_{TH}$ corresponding thereto etc.) as a parameter as depicted in FIG. 7, for example. Alternatively, for example, an actual output torque (actual engine torque) $T_E$ etc., of the engine 12 detected by a torque sensor etc., may be used for this engine torque $T_E$. The torque ratio t of the torque converter 14 is a function of a speed ratio e of the torque converter 14 ($=$a turbine rotation speed $N_T$ that is the output rotation speed of the torque converter 14/a pump rotation speed $N_P$ (the engine rotation speed $N_E$) that is the input rotation speed of the torque converter 14) and is calculated by the electronic control device 50 based on the actual speed ratio e from a relationship (a map, a predetermined operation characteristic diagram of the torque converter 14) between the speed ratio e and each of the torque ratio t, efficiency $\eta$, and a capacity coefficient C empirically obtained and stored in advance as depicted in FIG. 8, for example. The estimated engine torque $T_E$es is calculated to directly represent the actual engine torque $T_E$ and the estimated engine torque $T_E$es is assumed to be handled as the actual engine torque $T_E$ except the case that the actual engine torque $T_E$ is particularly distinguished. Therefore, the estimated engine torque $T_E$es is assumed to include the actual engine torque $T_E$.

Figure 9:
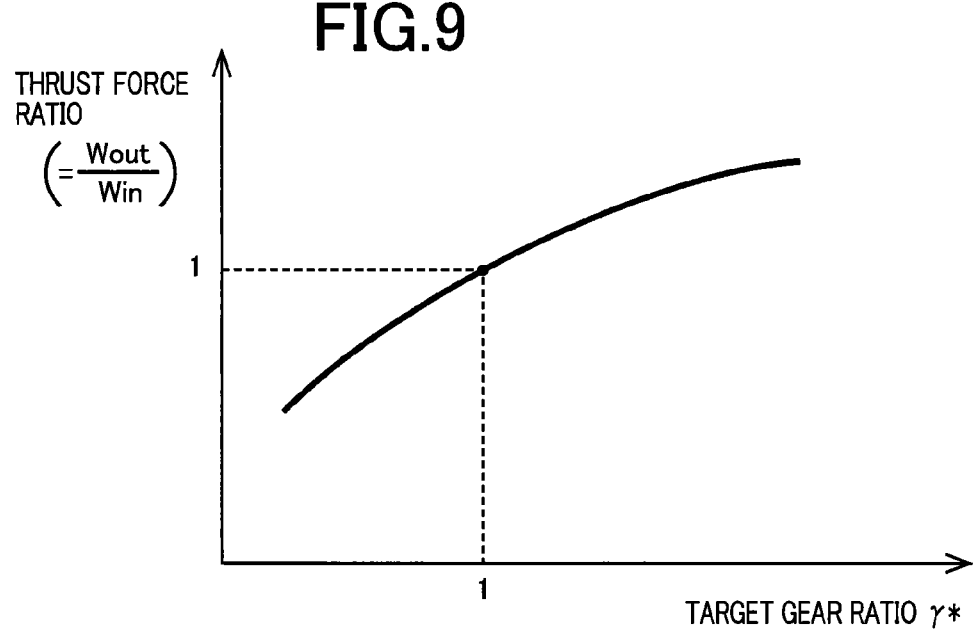
FIG. 9 is a diagram of an example of a relationship between a target gear ratio and a thrust force ratio set in advance for determining the thrust force ratios of the variable pulleys based on the target gear ratio in the hydraulic control related to the shift of the continuously variable transmission.

The continuously variable transmission control means 122 determines the thrust force ratio Rw ($=$Wout/Win) based on the target gear ratio $\gamma^*$ from a relationship empirically set in advance as depicted in FIG. 9, for example. As depicted in FIG. 9, the thrust force ratio Rw is made larger when the target gear ratio $\gamma^*$ is larger and, for example, the thrust force ratio Rw determined based on the target gear ratio $\gamma^*$ is a thrust force ratio Rw for steadily maintaining the gear ratio $\gamma$ of the continuously variable transmission 18 at the target gear ratio $\gamma^*$, i.e., a thrust force ratio Rw for maintaining the gear ratio $\gamma$ constant at the target gear ratio $\gamma^*$.

The continuously variable transmission control means 122 sets a target primary thrust force Win* ($=$Wout*/Rw) based on the determined thrust force ratio Rw and the target secondary thrust force Wout*, for example. As described above, the target primary thrust force Win* and the target secondary thrust force Wout* are basically set as thrust forces for achieving (maintaining) the target gear ratio $\gamma^*$ of the continuously variable transmission 18 while a belt slip of the continuously variable transmission 18 is prevented from occurring. For example, the continuously variable transmission control means 122 respectively converts the target primary thrust force Win* and the target secondary thrust force Wout* based on the pressure receiving areas of the hydraulic cylinders 42c and 46c to calculate a target primary pressure Pin* ($=$Win*/pressure receiving area) and a target secondary pressure Pout* ($=$Wout*/pressure receiving area) and determines the respective conversion values as the primary instruction pressure Pintgt and the secondary instruction pressure Pouttgt.

The continuously variable transmission control means 122 outputs the primary instruction pressure Pintgt and the secondary instruction pressure Pouttgt as the hydraulic control command signal $S_{SCT}$ to the hydraulic control circuit 100 so as to acquire the target primary pressure Pin* and the target secondary pressure Pout*, for example. The hydraulic control circuit 100 operates the linear solenoid valve SLP to adjust the primary pressure Pin and operates the linear solenoid valve SLS to adjust the secondary pressure Pout in accordance with the hydraulic control command signal $S_{CVT}$.

Various devices may have variation in terms of control and the variation exists in the hydraulic control related to the shift of the continuously variable transmission 18 of this embodiment. For example, the variation includes variation of the control oil pressures $P_{SLP}$ and $P_{SLS}$ relative to the control currents to the linear solenoid valves SLP and SLS, variation of a drive circuit outputting the control currents, and estimated errors of the input torque $T_{IN}$. Therefore, such variations may cause a belt slip of the continuously variable transmission 18 or may make the achievement (maintenance) of the target gear ratio $\gamma^*$ of the continuously variable transmission 18 impossible. Therefore, the continuously variable transmission control means 122 corrects a setting value of the target secondary thrust force Wout* (i.e., the target secondary pressure Pout*) based on a secondary pressure sensor value SPout such that a signal (the secondary pressure sensor value SPout) indicative of the secondary pressure Pout detected by the secondary pressure sensor 80 is set to the target secondary pressure Pout*, for example. Additionally, the continuously variable transmission control means 122 corrects a setting value of the target primary thrust force Win* (i.e., the target primary pressure Pin*) through feedback control based on a deviation $\Delta\gamma(=\gamma^*-\gamma)$ between the actual gear ratio $\gamma$ and the target gear ratio $\gamma^*$ such that the actual gear ratio $\gamma$ matches the target gear ratio $\gamma^*$, for example.

A rotation speed sensor such as the input shaft rotation speed sensor 56 and the output shaft rotation speed sensor 58 may not accurately detect a rotation speed in a low rotation speed range of a rotation speed extremely close to zero. For example, if a well-known electromagnetic pickup sensor is employed as a rotation speed sensor, when an actual rotation speed is within the low rotation speed range, the number of pulse signals within a predetermined time period may vary or the output timing of the pulse signals may be delayed due to the characteristics of the sensor, causing deterioration of detection accuracy. Therefore, for example, a rotation speed may not accurately be detected in the low rotation speed range due to the characteristics of the rotation speed sensor, and a detection value of a rotation speed (rotation sensor detection value) from the rotation speed sensor may not reflect the actual rotation speed. Therefore, if the rotation sensor detection value reflects the actual rotation speed, the target gear ratio $\gamma^*$ can properly be achieved through the feedback control of the target primary thrust force Win* (i.e., the target primary pressure Pin*) based on the deviation $\Delta\gamma$ between the actual gear ratio $\gamma$ and the target gear ratio $\gamma^*$. However, if the rotation sensor detection value does not reflect the actual rotation speed because of the running state in which the rotation speed falls within the low rotation speed range, the feedback control of the target primary thrust force Win* (i.e., the target primary pressure Pin*) may not properly be provided and the target gear ratio $\gamma^*$ may not properly be achieved due to the variation in terms of control described above. Particularly, in the low rotation speed range where the detection accuracies of the input shaft rotation speed sensor 56 and the output shaft rotation speed sensor 58 may deteriorate, it is desirable to maintain the gear ratio $\gamma$ of the continuously variable transmission 18 at the maximum gear ratio $\gamma$max so as to ensure the vehicle restart during vehicle stop or the reacceleration performance during low-speed running. However, even if the target primary thrust force Win* (i.e., the target primary pressure Pin*) and the target secondary thrust force Wout* (i.e., the target secondary pressure Pout*) are set for maintaining the maximum gear ratio $\gamma$max while preventing a belt slip in this low rotation speed range, the feedback control may not properly be provided and the maximum gear ratio $\gamma$max may not properly be maintained due to the variation in terms of control. Therefore, for example, during vehicle deceleration running, it is desirable to provide control to achieve the maximum gear ratio $\gamma$max while the rotation sensor detection value reflects the actual rotation speed; however, even if a shift is executed at the maximum shift speed (a change speed of a gear ratio) taking a belt slip etc., into consideration, the maximum gear ratio $\gamma$max may not be reached during rapid deceleration running etc.

Therefore, for example, if the electronic control device 50 of this embodiment determines that the actual rotation speed is not reflected by at least one of detection values of the input shaft rotation speed $N_{IN}$ and the output shaft rotation speed $N_{OUT}$ respectively detected by the input shaft rotation speed sensor 56 and the output shaft rotation speed sensor 58 so as to calculate the actual gear ratio $\gamma$ when the target gear ratio $\gamma^*$ is achieved, the electronic control device 50 differentiates the control methods of the primary thrust force Win (i.e., the primary pressure Pin) and the secondary thrust force Wout (i.e., the secondary pressure Pout) so as to maintain the maximum gear ratio $\gamma$max and preventing a slip of the transmission belt 48, based on whether the actual gear ratio is already the maximum gear ratio $\gamma$max. The differentiation of the control methods of the primary thrust force Win and the secondary thrust force Wout is performed during vehicle deceleration running when the control toward the maximum gear ratio $\gamma$max is provided such as when it is desirable to maintain the maximum gear ratio $\gamma$max while a belt slip is prevented so as to properly ensure the vehicle restart during vehicle stop or the reacceleration performance during low-speed running, for example. The thrust forces (the primary thrust force Win and the secondary thrust force Wout) for maintaining the maximum gear ratio $\gamma$max with a slip of the transmission belt 48 prevented are, for example, the target secondary thrust force Wout* sequentially set based on the input torque $T_{IN}$ of the continuously variable transmission 18 by the continuously variable transmission control means 122 when the target gear ratio $\gamma^*$ of the continuously variable transmission 18 is set to the maximum gear ratio $\gamma$max, and the target primary thrust force Wm* sequentially set based on the target secondary thrust force Wout* and the thrust force ratio Rw based on the target gear ratio $\gamma^*$.

More specifically, returning to FIG. 4, a rotation sensor value accuracy determining portion, i.e., a rotation sensor value accuracy determining means 124 determines, for example, whether the actual rotation speed is reflected by both detection values of the input shaft rotation speed $N_{IN}$ and the output shaft rotation speed $N_{OUT}$ respectively detected by the input shaft rotation speed sensor 56 and the output shaft rotation speed sensor 58, based on whether the both detection values of the input shaft rotation speed $N_{IN}$ and the output shaft rotation speed $N_{OUT}$ are equal to or greater than a predetermined extremely low rotation speed N'. This predetermined extremely low rotation speed N' is an extremely low rotation speed determination value empirically obtained and set in advance such that if a rotation sensor detection value becomes less than the extremely low rotation speed N', a rotation speed falls within the rotation speed range in which the reliability of the rotation sensor detection value is reduced because the rotation sensor detection value cannot accurately detect the actual rotation speed due to sensor characteristics, for example. Therefore, for example, when at least one of the detection values of the input shaft rotation speed $N_{IN}$ and the output shaft rotation speed $N_{OUT}$ is within the rotation speed range less than the predetermined extremely low rotation speed N', the rotation sensor value accuracy determining means 124 determines that at least one of the detection values of the input shaft rotation speed $N_{IN}$ and the output shaft rotation speed $N_{OUT}$ does not reflect the actual rotation speed. The rotation sensor value accuracy determining means 124 determines, for example, whether both detection values of the input shaft rotation speed $N_{IN}$ and the output shaft rotation speed $N_{OUT}$ reflect the actual rotation speed to determine whether the rotation sensor detection value is credible. The predetermined extremely low rotation speed N' is desirably set for each rotation speed sensor such as the input shaft rotation speed sensor 56 and the output shaft rotation speed sensor 58, for example.

For example, if the rotation sensor value accuracy determining means 124 determines that the both detection values of the input shaft rotation speed $N_{IN}$ and the output shaft rotation speed $N_{OUT}$ reflect the actual rotation speed, i.e., if the rotation sensor value accuracy determining means 124 determines that the rotation sensor detection value is credible, the continuously variable transmission control means 122 controls the primary thrust force Win (i.e., the primary pressure Pin) and the secondary thrust force Wout (i.e., the secondary pressure Pout) so as to acquire the thrust forces (the target primary thrust force Win* and the target secondary thrust force Wout*) for achieving the target gear ratio γ* of the continuously variable transmission 18 while preventing a belt slip of the continuously variable transmission 18 from occurring, as described above.

For example, if the rotation sensor value accuracy determining means 124 determines that at least one of the detection values of the input shaft rotation speed $N_{IN}$ and the output shaft rotation speed $N_{OUT}$ does not reflect the actual rotation speed, i.e., if the rotation sensor value accuracy determining means 124 determines that the rotation sensor detection value is not credible, a maximum gear ratio arrival determining portion, i.e., a maximum gear ratio arrival determining means 126, determines whether the actual gear ratio γ is already the maximum gear ratio γmax. This maximum gear ratio γmax is a maximum gear ratio determination value obtained and set in advance for enabling determination of a gear ratio corresponding to the Lowest set by hardware, for example.

If the maximum gear ratio arrival determining means 126 determines that the actual gear ratio γ is already the maximum gear ratio γmax, the continuously variable transmission control means 122 sets the target primary thrust force Win* and the target secondary thrust force Wout* as the thrust forces for maintaining the maximum gear ratio γmax and preventing a slip of the transmission belt 48 and sets only the target primary thrust force Win* lower by a predetermined value. On the other hand, for example, if the maximum gear ratio arrival determining means 126 determines that the actual gear ratio γ is not yet the maximum gear ratio γmax, the continuously variable transmission control means 122 sets the target primary thrust force Win* and the target secondary thrust force Wout* to be the thrust forces for maintaining the maximum gear ratio γmax and preventing a slip of the transmission belt 48 and sets only the target secondary thrust force Wout* higher by a predetermined value. This predetermined value is a value empirically obtained and set in advance to correspond control variation amounts of the primary thrust force Win and the secondary thrust force Wout for certainly acquiring the thrust forces for maintaining the maximum gear ratio γmax and preventing a slip of the transmission belt 48 when the thrust forces are controlled. This control variation amount is variation in terms of control in the hydraulic control related to the shift of the continuously variable transmission 18 as described above, for example. Therefore, this control variation amount is variation in terms of control for acquiring the pulley pressures (the primary pressure Pin and the secondary pressure Pout) for at least maintaining the maximum gear ratio γmax and preventing a slip of the transmission belt 48 no matter how much the primary pressure Pin and the secondary pressure Pout vary relative to the primary instruction pressure Pintgt and the secondary instruction pressure Pouttgt, for example.

As described above, this embodiment is conceived in terms of which of the target primary thrust force Win* (i.e., the primary instruction pressure Pintgt) and the target secondary thrust force Wout* (i.e., the secondary instruction pressure Pouttgt) the control variation amount is applied to for certainly achieving the maximum gear ratio γmax if it is determined that at least one of the detection values of the input shaft rotation speed $N_{IN}$ and the output shaft rotation speed $N_{OUT}$ does not reflect the actual rotation speed.

More specifically, if it is known that the actual gear ratio γ is the maximum gear ratio γmax even though the rotation sensor detection value does not reflect the actual rotation speed, the movable rotating body 42b is mechanically prevented from moving in the direction of widening the V-groove width of the input-side variable pulley 42 (i.e., is abutting on a hardware limit) and does not move any more and, therefore, the belt clamping pressure does not decrease any more. Therefore, even if the primary instruction pressure Pintgt is reduced from the setting value for maintaining the maximum gear ratio γmax in consideration of the control variation amount without providing the feedback control of the primary thrust force Win (i.e., the primary pressure Pin) based on the rotation sensor detection value with poor accuracy, the belt clamping pressure is ensured while the maximum gear ratio γmax is maintained, and no belt slip occurs. Since the primary pressure Pin can be reduced, a fuel efficiency improving effect can be acquired.

On the other hand, if the actual gear ratio γ does not reach the maximum gear ratio γmax, the position of the movable rotating body 42b is unknown because the rotation sensor detection value does not reflect the actual rotation speed and, therefore, when the primary thrust force Win (i.e., the primary pressure Pin) is reduced so as to achieve the maximum gear ratio γmax from the setting value for maintaining the maximum gear ratio γmax, the movable rotating body 42b may move in the direction of loosening the transmission belt 48 and cause a belt slip. Therefore, to achieve the maximum gear ratio γmax, while the thrust forces (the target primary thrust force Win* and the target secondary thrust force Wout*) for maintaining the maximum gear ratio γmax with a slip of the transmission belt 48 prevented are set to provide the control toward the maximum gear ratio γmax, the control variation amount is added to the target secondary thrust force Wout* (i.e., the secondary instruction pressure Pouttgt) to provide the control such that a belt slip is prevented from occurring.

Figure 10:
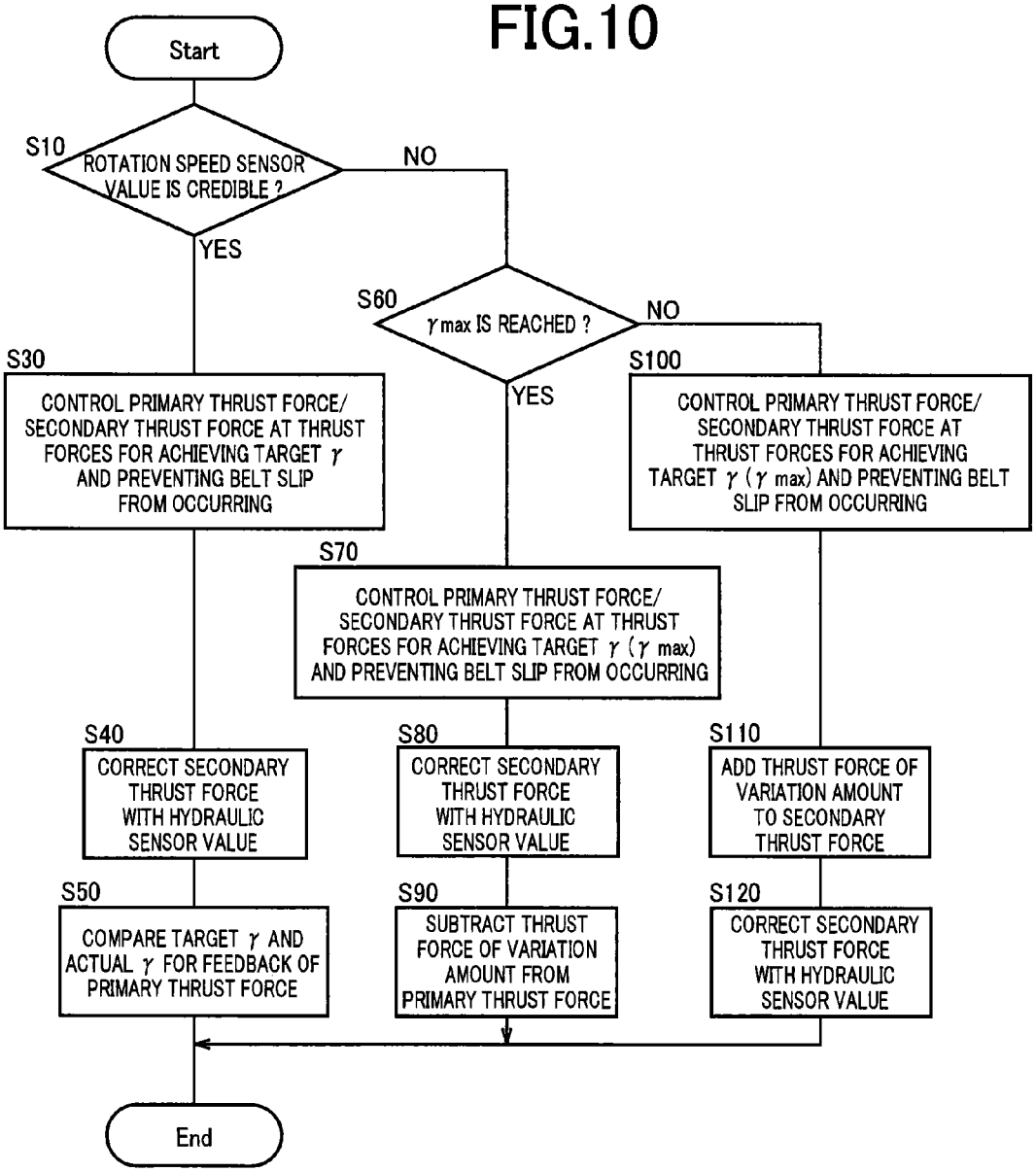
FIG. 10 is a flowchart for explaining a main portion of the control operation of the electronic control device, i.e., the control operation for achieving the maximum gear ratio without causing a belt slip even when the rotation sensor detection value does not reflect the actual rotation speed.
Figure 11:
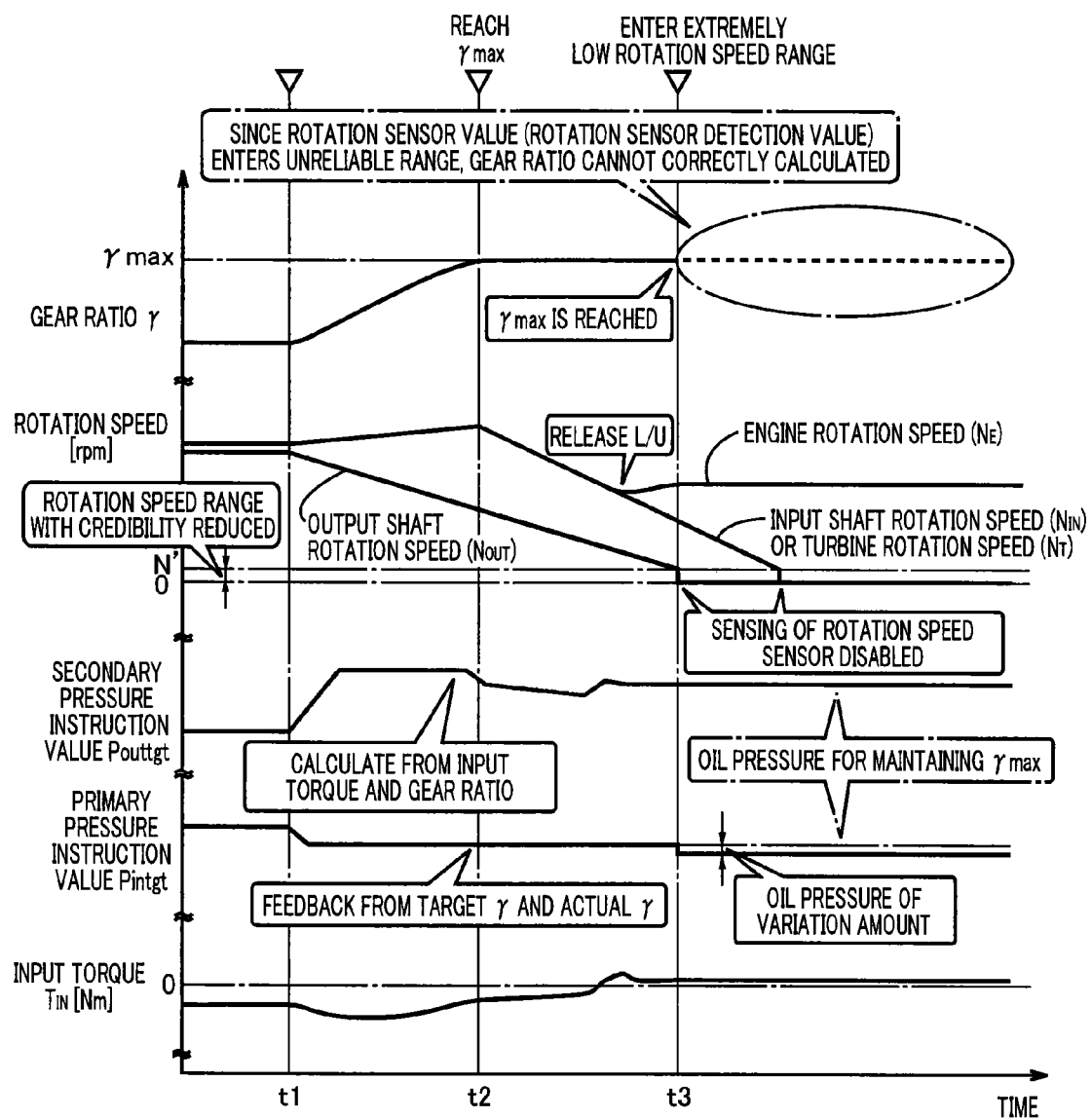
FIG. 11 is a time chart of an example when the control operation depicted in the flowchart of FIG. 10 is performed.
Figure 12:
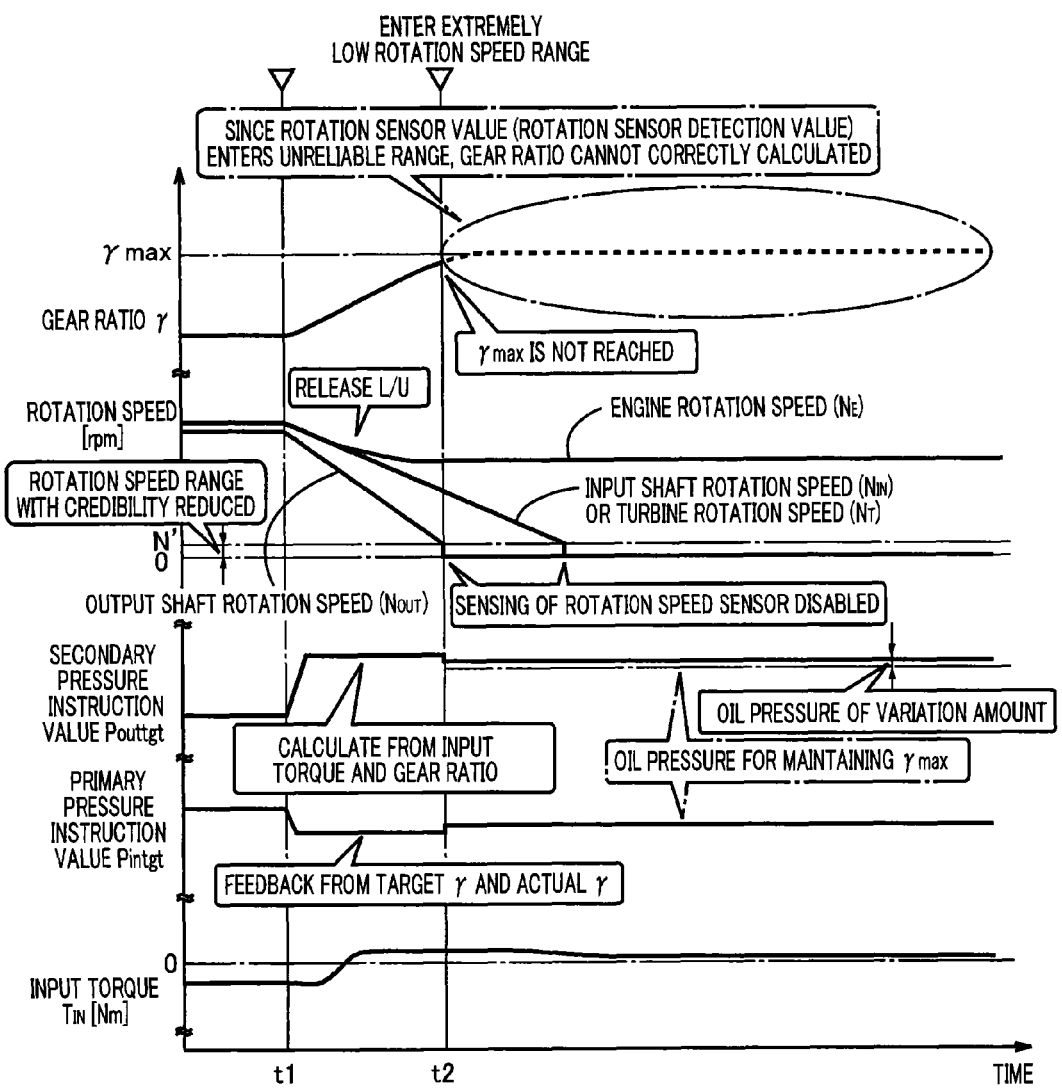
FIG. 12 is a time chart of an example when the control operation depicted in the flowchart of FIG. 10 is performed, and is a different embodiment from FIG. 11.

FIG. 10 is a flowchart for explaining a main portion of the control operation of the electronic control device 50, i.e., the control operation for achieving the maximum gear ratio γmax without causing a belt slip even when the rotation sensor detection value does not reflect the actual rotation speed and is repeatedly executed with an extremely short cycle time, for example, on the order of few msec to a few tens of msec. FIGS. 11 and 12 are time charts of an example when the control operation depicted in the flowchart of FIG. 10 is performed. The flowchart of FIG. 10 is executed on the premise of the vehicle deceleration running while the control toward the maximum gear ratio γmax is provided, for example.

In FIG. 10, first, at step (hereinafter, "step" will be omitted) S10 corresponding to the rotation sensor value accuracy determining means 124, for example, it is determined whether the actual rotation speed is reflected by both detection values of the input shaft rotation speed $N_{IN}$ and the output shaft rotation speed $N_{OUT}$ respectively detected by the input shaft rotation speed sensor 56 and the output shaft rotation speed sensor 58, i.e., whether the rotation sensor detection value (rotation speed sensor value) is credible, based on whether the both detection values of the input shaft rotation speed $N_{IN}$ and the output shaft rotation speed $N_{OUT}$ are equal to or greater than the predetermined extremely low rotation speed N'. If this determination of S10 is affirmative, at S30 to S50 corresponding to the continuously variable transmission control means 122, for example, the primary instruction pressure Pintgt and the secondary instruction pressure Pouttgt are output as the hydraulic control command signal $S_{CVT}$ to the hydraulic control circuit 100 to control the primary thrust force Win (i.e., the primary pressure Pin) and the secondary thrust force Wout (i.e., the secondary pressure Pout) so as to acquire the thrust forces (the target primary thrust force Win* and the target secondary thrust force Wout*) for achieving the target gear ratio γ* of the continuously variable transmission 18 while a belt slip of the continuously variable transmission 18 is prevented from occurring (before time t3 of FIG. 11 and before time t2 of FIG. 12). In this case, in consideration of variation in the hydraulic control related to the shift of the continuously variable transmission 18, a setting value of the target secondary thrust force Wout* (i.e., the target secondary pressure Pout*) is corrected based on the secondary pressure sensor value SPout such that the secondary pressure sensor value SPout is set to the target secondary pressure Pout*, for example. Additionally, a setting value of the target primary thrust force Win* (i.e., the target primary pressure Pin*) is corrected through the feedback control based on the deviation Δγ between the actual gear ratio γ and the target gear ratio γ* such that the actual gear ratio γ matches the target gear ratio γ*, for example. On the other hand, if the determination of S10 is negative, at S60 corresponding to the maximum gear ratio arrival determining means 126, it is determined whether the actual gear ratio γ is already the maximum gear ratio γmax, for example.

If the determination of S60 is affirmative, at S70 to S90 corresponding to the continuously variable transmission control means 122, for example, the primary thrust force Win (i.e., the primary pressure Pin) and the secondary thrust force Wout (i.e., the secondary pressure Pout) are controlled so as to acquire the thrust forces (the target primary thrust force Win* and the target secondary thrust force Wout*) for maintaining the maximum gear ratio γmax and preventing a slip of the transmission belt 48 (after time t3 of FIG. 11). In this case, a setting value of the target secondary thrust force Wout* (i.e., the target secondary pressure Pout*) is corrected based on the secondary pressure sensor value SPout such that the secondary pressure sensor value SPout is set to the target secondary pressure Pout*, for example. Additionally, only the target primary thrust force Win* (i.e., the primary instruction pressure Pintgt) is set lower by the control variation amount relative to the thrust force for maintaining the maximum gear ratio γmax so as to certainly maintain the maximum gear ratio γmax and preventing a slip of the transmission belt 48. On the other hand, if the determination of S60 is negative, at S100 to S120 corresponding to the continuously variable transmission control means 122, for example, the primary thrust force Win (i.e., the primary pressure Pin) and the secondary thrust force Wout (i.e., the secondary pressure Pout) are controlled so as to acquire the thrust forces (the target primary thrust force Win* and the target secondary thrust force Wout*) for maintaining the maximum gear ratio γmax and preventing a slip of the transmission belt 48 (after time t2 of FIG. 12). In this case, only the target secondary thrust force Wout* (i.e., the secondary instruction pressure Pouttgt) is set higher by the control variation amount relative to the thrust force for maintaining the maximum gear ratio γmax so as to certainly maintain the maximum gear ratio γmax and preventing a slip of the transmission belt 48, for example. Additionally, the setting value of the target secondary thrust force Wout* (i.e., the target secondary pressure Pout*) is further corrected based on the secondary pressure sensor value SPout such that the secondary pressure sensor value SPout is set to the target secondary pressure Pout*.

As described above, according to this embodiment, if it is determined that the actual rotation speed is not reflected by at least one of the detection values of the input shaft rotation speed $N_{IN}$ and the output shaft rotation speed $N_{OUT}$ for calculating the actual gear ratio γ when the target gear ratio γ* is achieved, the control methods of the primary thrust force Win (i.e., the primary pressure Pin) and the secondary thrust force Wout (i.e., the secondary pressure Pout) are differentiated based on whether the actual gear ratio γ is already the maximum gear ratio γmax and, therefore, for example, even when the actual rotation speed is not reflected by the rotation sensor detection value (the detection values of input shaft rotation speed $N_{IN}$ and the output shaft rotation speed $N_{OUT}$), the actual gear ratio γ can be retained at the maximum gear ratio γmax without causing a belt slip of the continuously variable transmission 18 regardless of whether the actual gear ratio γ is already the maximum gear ratio γmax.

According to this embodiment, if the actual gear ratio γ is already the maximum gear ratio γmax, the target primary thrust force Win* and the target secondary thrust force Wout* are set as the thrust forces for maintaining the maximum gear ratio γmax and preventing a slip of the transmission belt 48 and the target primary thrust force Win* is made lower by a predetermined value and, therefore, for example, the control can be provided such that a slip of the transmission belt 48 is prevented from occurring while maintaining the maximum gear ratio γmax. Since the primary thrust force Win (the primary pressure Pin) in the input-side variable pulley 42 can be reduced, the fuel efficiency improving effect can be acquired. In other words, if it is known that the actual gear ratio γ is the maximum gear ratio γmax, the movable rotating body 42b is mechanically prevented from moving and the reduction of the primary thrust force Win (the primary pressure Pin) from the setting value for maintaining the maximum gear ratio max does not move the movable rotating body 42b and does not reduce the belt clamping pressure any more. Therefore, even if the target primary thrust force Win* (the target primary pressure Pin*) is made lower by a predetermined value, the maximum gear ratio γmax can be maintained while a slip of the transmission belt 48 is prevented.

According to this embodiment, if the actual gear ratio γ is not yet the maximum gear ratio γmax, the target primary thrust force Win* and the target secondary thrust force Wout* are set as the thrust forces for maintaining the maximum gear ratio γmax and preventing a slip of the transmission belt 48 and the target secondary thrust force Wout* is made higher by a predetermined value and, therefore, for example, even if the gear ratio γ does not reach the maximum gear ratio γmax during the running state in which the rotation sensor detection value reflects the actual rotation speed, a belt slip can be prevented while the gear ratio γ is controlled toward the maximum gear ratio γmax. In other words, if the maximum gear ratio γmax is not reached, the movement position of the movable rotating body 42b is unknown and, therefore, when the primary thrust force Win (the primary pressure Pin) is reduced from the setting value for maintaining the maximum gear ratio γmax, the movable rotating body 42b may move in the direction of loosening the transmission belt 48 and cause a belt slip. Therefore, only the target secondary thrust force Wout* (i.e., the target secondary pressure Pout*) is made higher by a predetermined value relative to the setting value for maintaining the maximum gear ratio γmax to maintain the maximum gear ratio γmax and preventing a slip of the transmission belt 48.

According to this embodiment, since the thrust force for maintaining the maximum gear ratio γmax is sequentially set based on the input torque $T_{IN}$ of the continuously variable transmission 18 and the predetermined value is a value obtained in advance as a control variation amount of the thrust force so as to certainly acquire the thrust force capable of maintaining the maximum gear ratio γmax when the primary thrust force Win and the secondary thrust force Wout are controlled, the maximum gear ratio γmax can properly be maintained while a slip of the transmission belt 48 is certainly prevented, for example.

According to this embodiment, the control methods of the primary thrust force Win and the secondary thrust force Wout are differentiated during the vehicle deceleration running while the control toward the maximum gear ratio γmax is provided, the actual gear ratio γ can be retained at the maximum gear ratio γmax without causing a belt slip of the continuously variable transmission 18 during vehicle stop and during extremely-low-speed running, for example. Therefore, the vehicle restart performance during vehicle stop and the reacceleration performance during low-speed running are properly ensured.

According to this embodiment, when a rotation sensor detection value is less than the extremely low rotation speed N' obtained in advance as a rotation speed range in which the reliability of the rotation sensor detection value is reduced, it is determined that the rotation sensor detection value does not reflect the actual rotation speed and, therefore, the actual gear ratio γ can be retained at the maximum gear ratio γmax without causing a belt slip of the continuously variable transmission 18 during vehicle stop and during extremely-low-speed running, for example. Therefore, the vehicle restart performance during vehicle stop and the reacceleration performance during low-speed running are properly ensured.

Although the embodiment of the present invention has been described in detail with reference to the drawings, the present invention is applied in other forms.

For example, in the embodiment, when it is determined that the rotation sensor detection value does not reflect the actual rotation speed, a control variation amount for certainly acquire the maximum gear ratio γmax with a belt slip prevented is added/subtracted as the predetermined value to/from the primary thrust force Win (i.e., the primary pressure Pin) and the secondary thrust force Wout (i.e., the secondary pressure Pout) for maintaining the maximum gear ratio γmax and preventing a slip of the transmission belt 48; however, this is not necessarily a limitation. For example, if the predetermined value is a value at least equal to or greater than the control variation amount, the effect of the present invention is acquired that the actual gear ratio γ can be retained at the maximum gear ratio γmax without causing a belt slip of the continuously variable transmission 18 even when the rotation sensor detection value does not reflect the actual rotation speed, regardless of whether the actual gear ratio γ is already the maximum gear ratio γmax. Particularly, when the actual gear ratio γ is already the maximum gear ratio γmax, even if the primary thrust force Win (the primary pressure Pin) is made too low from the setting value for maintaining the maximum gear ratio γmax (in an extreme case, even if the primary thrust force Win is set to zero), the abutment on the hardware limit prevents the movable rotating body 42b from moving and a belt slip from occurring. However, to properly ensure the vehicle restart performance during vehicle stop or the reacceleration performance during low-speed running, it is most advantageous to reduce the primary thrust force Win (the primary pressure Pin) by the control variation amount. If the actual gear ratio γ is not yet the maximum gear ratio γmax, the reduction of fuel efficiency can be minimized by making the secondary thrust force Wout higher by the control variation amount from the setting value for maintaining the maximum gear ratio γmax.

Although the embodiment uses the torque converter 14 including the lockup clutch 26 as a hydraulic transmission device, the lockup clutch 26 may not necessarily be included and another hydraulic power transmission device such as a fluid coupling (fluid coupling) without a torque amplification effect may be used instead of the torque converter 14.

The described embodiment is merely an exemplary embodiment and the present invention may be implemented in variously modified and improved forms based on the knowledge of those skilled in the art.

Description Of Reference Numerals

18: belt type continuously variable transmission (continuously variable transmission for a vehicle)
42: input-side variable pulley
42b: movable rotating body (input-side movable rotating body)
46: output-side variable pulley
48: transmission belt
50: electronic control device (control device)

The invention claimed is:

1. A control device of a continuously variable transmission for a vehicle having a pair of variable pulleys with variable effective diameters of an input-side variable pulley and an output-side variable pulley and a transmission belt wrapped around between the pair of the variable pulleys, the control device controlling an input-side thrust force of the input-side variable pulley and an output-side thrust force of the output-side variable pulley to set an actual gear ratio to a target gear ratio and preventing a slip of the transmission belt, the continuously variable transmission having a lowest-speed-side gear ratio determined by mechanically preventing movement of an input-side rotating body moved in an axial direction for varying an effective diameter of the input-side variable pulley, the control device comprising:
   a rotation sensor value accuracy determining portion configured to determine whether both detection values of an input shaft rotation speed and an output shaft rotation speed reflect an actual rotation speed;
   a maximum gear ratio arrival determining portion configured to determine, when the rotation sensor value accuracy determining portion determines that at least one of the detection values of the input shaft rotation speed and the output shaft rotation speed does not reflect the actual rotation speed, whether the actual gear ratio calculated based on the input shaft rotation speed and the output shaft rotation speed is already the lowest-speed-side gear ratio; and
   a continuously variable transmission control portion configured to set, when the rotation sensor accuracy determining portion determines that at least one of the detection values of the input shaft rotation speed and the output shaft rotation speed does not reflect the actual rotation speed, a target input-side thrust force and a target output-side thrust force to be target thrust forces for maintaining the lowest-speed-side gear ratio and preventing the slip of the transmission belt, and
   based on whether the actual gear ratio is already the lowest-speed-side gear ratio, the continuously variable transmission control portion changing values of the input-side thrust force and the output-side thrust force each of which is independently controlled to adjust a pressure in order to obtain the target thrust forces for maintaining the lowest-speed-side gear ratio.

2. The control device of the continuously variable transmission for a vehicle of claim 1, wherein when the actual gear ratio is already the lowest-speed-side gear ratio, the continuously variable transmission control portion makes the target input-side thrust force lower by a predetermined value.

3. The control device of the continuously variable transmission for a vehicle of claim 1, wherein when the actual gear ratio is not yet the lowest-speed-side gear ratio, the continuously variable transmission control portion makes the target output-side thrust force higher by a predetermined value.

4. The control device of the continuously variable transmission for a vehicle of claim 2, wherein when the actual gear ratio is not yet the lowest-speed-side gear ratio, the continuously variable transmission control portion makes the target output-side thrust force higher by a predetermined value.

5. The control device of the continuously variable transmission for a vehicle of claim 2, wherein
the continuously variable transmission control portion sequentially sets the thrust forces for maintaining the lowest-speed-side gear ratio based on an input torque of the continuously variable transmission for a vehicle, and wherein
the predetermined value is a value obtained in advance to correspond control variation amounts of the input-side thrust force and the output-side thrust force for certainly acquiring the thrust forces capable of maintaining the lowest-speed-side gear ratio when the thrust forces are controlled.

6. The control device of the continuously variable transmission for a vehicle of claim 3, wherein
the continuously variable transmission control portion sequentially sets the thrust forces for maintaining the lowest-speed-side gear ratio based on an input torque of the continuously variable transmission for a vehicle, and wherein
the predetermined value is a value obtained in advance to correspond control variation amounts of the input-side thrust force and the output-side thrust force for certainly acquiring the thrust forces capable of maintaining the lowest-speed-side gear ratio when the thrust forces are controlled.

7. The control device of the continuously variable transmission for a vehicle of claim 4, wherein
the continuously variable transmission control portion sequentially sets the thrust forces for maintaining the lowest-speed-side gear ratio based on an input torque of the continuously variable transmission for a vehicle, and wherein
the predetermined value is a value obtained in advance to correspond control variation amounts of the input-side thrust force and the output-side thrust force for certainly acquiring the thrust forces capable of maintaining the lowest-speed-side gear ratio when the thrust forces are controlled.

8. The control device of the continuously variable transmission for a vehicle of claim 1, wherein the continuously variable transmission control portion sequentially changes the values of the input-side thrust force and the output-side thrust force during vehicle deceleration running when the gear ratio is controlled toward the lowest-speed-side gear ratio.

9. The control device of the continuously variable transmission for a vehicle of claim 2, wherein the continuously variable transmission control portion sequentially changes the values of the input-side thrust force and the output-side thrust force during vehicle deceleration running when the gear ratio is controlled toward the lowest-speed-side gear ratio.

10. The control device of the continuously variable transmission for a vehicle of claim 3, wherein the continuously variable transmission control portion sequentially changes the values of the input-side thrust force and the output-side thrust force during vehicle deceleration running when the gear ratio is controlled toward the lowest-speed-side gear ratio.

11. The control device of the continuously variable transmission for a vehicle of claim 4, wherein the continuously variable transmission control portion sequentially changes the values of the input-side thrust force and the output-side thrust force during vehicle deceleration running when the gear ratio is controlled toward the lowest-speed-side gear ratio.

12. The control device of the continuously variable transmission for a vehicle of claim 5, wherein the continuously variable transmission control portion sequentially changes the values of the input-side thrust force and the output-side thrust force during vehicle deceleration running when the gear ratio is controlled toward the lowest-speed-side gear ratio.

13. The control device of the continuously variable transmission for a vehicle of claim 6, wherein the continuously variable transmission control portion sequentially changes the values of the input-side thrust force and the output-side thrust force during vehicle deceleration running when the gear ratio is controlled toward the lowest-speed-side gear ratio.

14. The control device of the continuously variable transmission for a vehicle of claim 7, wherein the continuously variable transmission control portion sequentially changes the values of the input-side thrust force and the output-side thrust force during vehicle deceleration running when the gear ratio is controlled toward the lowest-speed-side gear ratio.

15. The control device of the continuously variable transmission for a vehicle of claim 1, wherein when at least one of the detection values of the input shaft rotation speed and the output shaft rotation speed is within a rotation speed range less than an extremely low rotation speed obtained in advance as a rotation speed range in which the reliability of the detection value is reduced, the rotation sensor value accuracy determining portion determines that at least one of the detection values of the input shaft rotation speed and the output shaft rotation speed does not reflect the actual rotation speed.

16. The control device of the continuously variable transmission for a vehicle of claim 2, wherein when at least one of the detection values of the input shaft rotation speed and the output shaft rotation speed is within a rotation speed range less than an extremely low rotation speed obtained in advance as a rotation speed range in which the reliability of the detection value is reduced, the rotation sensor value accuracy determining portion determines that at least one of the detection values of the input shaft rotation speed and the output shaft rotation speed does not reflect the actual rotation speed.

17. The control device of the continuously variable transmission for a vehicle of claim 3, wherein when at least one of the detection values of the input shaft rotation speed and the output shaft rotation speed is within a rotation speed range less than an extremely low rotation speed obtained in advance as a rotation speed range in which the reliability of the detection value is reduced, the rotation sensor value accuracy determining portion determines that at least one of the detection values of the input shaft rotation speed and the output shaft rotation speed does not reflect the actual rotation speed.

18. The control device of the continuously variable transmission for a vehicle of claim 4, wherein when at least one of the detection values of the input shaft rotation speed and the output shaft rotation speed is within a rotation speed range less than an extremely low rotation speed obtained in advance as a rotation speed range in which the reliability of the detection value is reduced, the rotation sensor value accuracy determining portion determines that at least one of the detection values of the input shaft rotation speed and the output shaft rotation speed does not reflect the actual rotation speed.

* * * * *